3,100,524
RECOVERY OF OIL FROM PARTIALLY DEPLETED
RESERVOIRS
Donald M. Beeson, Garwood, N.J., assignor to Jersey Production Research Company, a corporation of Delaware
No Drawing. Filed Sept. 9, 1959, Ser. No. 838,828
6 Claims. (Cl. 166—9)

The present invention relates to methods for the recovery of oil from subterranean reservoirs and more particularly relates to the use of a gas-driven solvent bank for reinstituting or increasing the production of oil from reservoirs partially depleted by primary recovery techniques. In still greater particularity, the invention relates to a secondary recovery process utilizing a gas-driven solvent bank wherein a bank of surfactant solution is introduced into the reservoir prior to the injection of solvent in order to increase the effectiveness with which oil is displaced from the reservoir.

Secondary recovery processes utilizing a gas-driven solvent bank have been widely publicized in recent years. In general, such processes involve the introduction of a bank of liquified petroleum gas, liquified propane or a similar solvent into a reservoir through one or more injection wells, the subsequent injection of gas into the reservoir in order to propel the bank of solvent through the reservoir, and the recovery of oil and solvent through one or more production wells penetrating the reservoir at some distance from the injection wells. Experimental studies and field results have demonstrated that such processes are considerably more effective than waterfloding, gas repressuring or the use of a water-driven solvent bank. The use of a gas-driven solvent bank permits the recovery of substantially more oil from partially depleted reservoirs than can be obtained by other secondary recovery methods and is often considerably more attractive from an economic standpoint than are other secondary recovery processes.

Despite the overall improvement in oil recovery made possible by the development of gas-driven solvent bank processes, however, it has been found that such processes are not wholly satisfactory. Appreciable quantities of oil frequently remain in the reservoir following such a secondary recovery operation. This can largely be explained by the fact that nearly all reservoirs contain connate water and, due to characteristics of the rock making up most oil reservoirs, are water-wet rather than oil-wet. As a result of this water-wet condition, the oil contained in the interstices of most reservoirs is surrounded by water held in place by capillary forces. The water tends to prevent the escape of oil from the interstices, particularly from the smaller ones in low permeability sections of such reservoirs. Oil recovered during primary recovery operations is therefore largely limited to that which was originally contained in relatively large, more permeable interstices of the reservoirs. The oil-miscible solvents used in gas-driven solvent bank processes have viscosities which are much lower than that of oil but are similar to oil in that they do not wet the rock making up most oil-bearing formations. When such a solvent is introduced into a partially depleted reservoir to effect secondary recovery, it flows into some of the interstices which still contain oil, reduces the oil's viscosity, and permits it to be displaced by the driving gas. In low permeability sections of the reservoir, however, the solvent does not readily enter the smaller interstices because it does not wet the rock and instead tends to finger or channel through the rock along the paths of least resistance. As a result, the oil contained in the less permeable sections of the reservoir is not diluted by solvent and cannot be displaced by the gas. The quantities of oil which are bypassed and left behind in the reservoir are often significant.

The present invention provides an improved secondary recovery process utilizing a gas-driven solvent bank in which the difficulties pointed out above are largely obviated. In accordance with the invention, it has now been found that the introduction of an aqueous surfactant solution into an oil reservoir to be subjected to secondary recovery by a gas-driven solvent bank results in the recovery of substantially greater quantities of oil than can otherwise be obtained. Conformance efficiency, indicating the fraction of the reservoir within the pattern area through which the gas-driven solvent bank moves, and displacement efficiency, indicating the fraction of the oil originally within the conformance volume which is displaced by the gas-driven solvent bank, are both increased and contribute to the improved recovery. The invention thus resides in a secondary recovery process utilizing a gas-driven solvent bank which is markedly superior to processes utilized in the past.

It is believed that the improved results obtained in accordance with the invention arise from the fact that the aqueous surfactant solution injected into the reservoir transforms the reservoir from a water-wet to an oil-wet state and thus permits solvent subsequently injected to penetrate into interstices which it would otherwise not reach. The aqueous surfactant solution, being a wetting agent for the rock in the reservoir, is readily imbibed into extremely small interstices due to capillary effects. Surfactant thus introduced into the interstices is adsorbed onto the surface of the rock surrounding such interstices. The presence of the adsorbed surfactant causes the interstices to repel water and to attract oleaginous materials. The reservoir thus becomes oil-wet rather than water-wet. Solvent later injected into the reservoir is therefore imbibed into the interstices to a much greater extent than it would be otherwise. The solvent tends to dilute the oil in the interstices and facilitates its displacement by the gas. This is, of course, only one of several possible explanations for the improved results obtained in accordance with the invention. Other mechanisms may be involved.

A wide variety of anionic, cationic and nonionic surface active agents may be employed in carrying out the process of the invention. Representative examples of anionic surfactants useful for purposes of the invention include ethylene diamine tetraacetic acid, alkali metal salts of ethylene diamine tetraacetic acid, alkali metal salts of alkyl aryl polyester sulfonates, alkali metal organic phosphates, alkali metal salts of petroleum sulfonates, diethyl nonyl sodium sulfate, diethyl hexyl sodium phosphate, ethyl hexyl sodium sulfonate, methyl ethyl hendecyl sodium sulfate, sodium sulfated alcohols, sodium naphthalene sulfonic acid condensate, sodium silicate, decyl benzene sodium sulfate, perfluoro capryllic acid, sodium lignosulfonate, sodium metasilicate hydrate, sodium lauryl sulfoacetate, sodium alklyl naphthalene sulfonate, diamyl sulfosuccinic ester, isopropyl sodium sulfonate, dioctyl ester of sodium sulfosuccinic acid, sulfonated castor oil, sulfonated tall oil, ammonium perfluoro lauric acid and the like.

Cationic surface active agents which may be employed in the practice of the present invention include diisobutyl sodium sulfosuccinate, alkyl benzyl trimethyl ammonium chlorides, substitute oxazolines, fatty acid imidazolines, acetic acid salts of fatty amines, alkyl triethyl ammonium chlorides, dialkyl dimethyl ammonium chlorides, alkyl trimethyl ammonium chlorides, polyoxyethylene condensates of stearyl amine, polyoxyethylene condensates of soy bean amine, phenoxy trialkyl benzyl ammonium chlorides, alkyl tolyl trimethyl ammonium chlorides, stearyl dimethyl benzyl ammonium chlorides, alkyl dodecyl benzyl trimethyl ammonium chlorides, diisobutyl phenoxyethoxyethyl diethyl benzyl ammonium chlorides, tertiary alkyl tetraethoxyethanol amine and the like.

Suitable nonionic surface active agents for use in accordance with the invention include fatty alkylol amide condensates, substituted polyamines, polyoxyethylene condensates of fatty alcohols, polyoxyethylene condensates of fatty acids, polyoxyethylene condensates of castor oil, polyoxyethylene esters of stearic acid, polyoxyethylene esters of rosin acid, polyoxyethylene esters of coco acid, polyoxyethylene condensates of coco amides, polyoxyethylene condensates of hydrogenated tallow, polyoxyethylene sorbitan monolaurate, polyoxyethylene sorbitan dilaurate, polyoxyethylene sorbitan monooleate, polyoxyethylene alkyl phenols, glycerol mannitan laurate, polyoxethylene dodecyl thioether, polyoxyethylated polyoxypropylene, polyoxyethylene aliphatic ethers, polyoxyethylene thioethers, polyoxyethylene condensates of hydroabietyl alcohol, polyoxylated polyoxypropylene amine, phosphoric acid esters of polyethylene glycol, condensation products of polyhydric alcohols with polybasic water-soluble acids such as glycol tartrate esterified with stearic acid, saponins and the like.

Anionic and cationic surface active agents are particularly preferred for purposes of the invention. Experience has shown that ionic surfactants are more readily adsorbed upon the porous rock making up water-wet subterranean reservoirs than are the nonionic materials and are therefore more effective for changing the wettability characteristics of the rock. This greater effectiveness permits use of the anionic and cationic surfactants at concentrations below those at which the nonionic agents can be employed.

Since the surface active agents utilized in accordance with the invention are injected into the reservoir in aqueous solutions, it will be obvious that they must be sufficiently soluble in water to permit the formation of such a solution. In general anionic and cationic surfactants are primarily oil-soluble but can be rendered primarily water-soluble by neutralizing them with inorganic acids or bases to form salts. It should be understood, however, that many surfactants which are primarily oil-soluble nevertheless have sufficient water solubility to permit their use in aqueous solutions in the concentrations required for purposes of the invention. The oil-soluble surfactants listed in the preceding paragraphs are of this type.

In addition to the anionic, cationic and nonionic surfactants specifically listed above, other commercially available surface active agents and mixtures of surface active agents may be utilized in the process of the invention. Further information concerning such agents may be found in "Encyclopedia of Surface Active Agents" by J. P. Sisley, translated from the French by P. J. Wood, Chemical Publishing Company, New York, 1952. It will be recognized, however, that all surface active agents are not equally effective in the process and that water-soluble anionic and cationic surfactants are preferred for purposes of the invention.

The concentration of surface active agent in the aqueous surfactant solution employed in accordance with the invention will depend in large part upon the particular agent utilized. Sufficient active material must be present in the solution to affect the wettability of the reservoir; while at the same time the concentration should be maintained below the level at which difficulties due to formation of oil-water emulsions are encountered. Most surfactants are excellent emulsifiers when employed in aqueous solutions at concentrations greater than about 1 percent. In order to avoid blocking of the interstices in reservoirs in which the solution is injected and thus reducing reservoir permeability, surfactant concentrations in the solution should therefore generally be maintained below about one per cent. Below this concentration, the effectiveness of the solution normally varies directly with variations in the amount of surfactant in the solution. Surfactant concentrations between about 0.005 percent by weight and about 1.0 percent by weight are generally suitable for purposes of the invention and concentrations between about 0.01 percent and about 0.5 percent have been found to be particularly effective.

The quantity of aqueous surfactant solution introduced into a reservoir in advance of the solvent bank during a secondary recovery process carried out in accordance with the invention will depend largely upon such well recognized factors as the recovery pattern, the spacing between wells, the porosity of the formation, and the thickness of the formation. Ideally, the quantity of solution employed should be such that all of the surfactant is consumed in converting the entire reservoir from a water-wet to an oil-wet condition as the bank of solution traverses the reservoir. Since the amount of solution required to accomplish this cannot be precisely determined in advance, the most convenient method of expressing the quantity of surfactant solution to be used is in terms of reservoir pore volume. In general from about 0.1 pore volume to about 0.75 pore volume of solution will be utilized. Quantities in the upper part of this range may be required for operations in which relatively dilute solutions are employed or in which surfactants not adsorbed upon the rock to a high degree are used. Lesser quantities may be utilized where the surfactant employed is a highly effective one and where the concentration of the solution is high. Quantities in the range between about 0.1 pore volume and about 0.5 pore volume are preferred.

In carrying out the process of the invention, the surfactant solution is first injected into the reservoir through one or more injection wells arranged in a logically spaced pattern. Five spot, seven spot or other conventional patterns may be utilized. After a sufficient volume of solution to effect a transformation of the entire reservoir from a water-wet to an oil-wet state, from about 0.1 to about 0.75 pore volume has been introduced, the injection of surfactant solution is halted. A bank of liquified, normally gaseous, low molecular weight hydrocarbons, a bank of ethane, propane, butane or LPG for example, is then introduced into the reservoir. The quantity of liquified hydrocarbons thus introduced will normally range between about 0.1 and about 0.75 pore volume. About 0.1 to about 0.5 pore volume is generally preferred. Sufficient pressure will be maintained on the reservoir to prevent vaporization of the liquified hydrocarbons. The precise pressure utilized will, of course, depend upon the temperature of the reservoir and the vapor pressure of the particular hydrocarbon solvent employed. Pressures between about 200 pounds per square inch and about 600 pounds per square inch will normally be required to maintain propane in liquid state at ordinary reservoir temperatures between about 80° F. and about 200°F. Higher pressures will be required if ethane is utilized; while somewhat lower pressures will suffice where butane is employed. Pressures approaching the reservoir fracturing pressure may be utilized if desired. Reservoir pressures can be controlled by regulating the back pressure at the production well.

After the bank of surfactant solution and the bank of liquified solvent have thus been introduced into the reservoir, they are propelled through the reservoir toward one or more production wells by injecting driving gas through the injection wells. The driving gas used will ordinarily be natural gas but air, methane, engine exhaust gases and other similar gases may be employed. As the surfactant solution proceeds through the reservoir, it displaces a portion of the oil initially present therein. The relative permeability during this stage of the process is a favorable one because a wetting agent, the aqueous surfactant solution, is employed to displace a non-wetting agent, the oil initially in place. The surfactant contained in the solution is adsorbed upon the rock as the solution is advanced and thus converts the reservoir from a water-wet to an oil-wet state. Solvent following the bank of surfactant solution then flows into the interstices filled with the solution. Again a favorable permeability relationship is obtained, since the displacing solvent now constitutes the wetting phase and the displaced liquid, the aqueous solution, is now a non-wetting phase. Capillary effects which promote the entry of fluids into minute interstices in the reservoir are thus obtained at both the water-oil interface and the solvent-water interface. A much more favorable mobility ratio than would otherwise be possible results. Conformance efficiency and displacement efficiency are both considerably higher than in conventional processes. These improved efficiencies result in more complete displacement of oil from the reservoir. The displaced oil, water and solvent are recovered from the reservoir through the production wells and are separated from one another by conventional techniques. The water and solvent may be recycled if desired.

Since the driving fluid employed in solvent displacement processes must enter the interstices of the reservoir and efficiently displace the solvent if significant recovery is to be obtained, it will be recognized that the present invention is limited to processes utilizing a gaseous driving fluid. Comparable results are not attained in processes wherein water is employed as the driving fluid. Water does not readily enter into minute interstices of the reservoir following adsorption of the surface active agent therein because the water is not a wetting agent for the oil-wet rock. The use of a surfactant bank in advance of a water-driven solvent bank therefore tends to adversely affect the mobility ratio so far as the solvent and water drive are concerned.

The advantages of the process of the invention can be better understood by considering the results of a series of tests carried out to demonstrate the process. In these tests, a core of Torpedo sandstone measuring three inches in diameter and 11¾ inches in length was utilized. These dimensions were selected in order that results simulating those in an actual reservoir, rather than simple linear flow as obtained in relatively small diameter cores, might be obtained. The porosity of the core was about 25 percent and therefore the total pore volume of the core was about 340 cubic centimeters. Torpedo standstone is water-wet and has a permeability in the range between about 500 and 1,500 millidarcies. The core was centered in a steel tube and the annular space between the sandstone and the tube wall was filled with a low melting point alloy which expands on solidification. A fluid-tight seal was thus obtained between the core and the steel cylinder. Fluid inlets and outlets were located at opposite ends of the model. To eliminate air from the core, it was purged with carbon dioxide and then saturated with a brine solution containing one percent sodium chloride. The brine was then displaced with a heavy oil having a viscosity between about 100 and 110 centipoises at room temperature until the brine content of the core had been reduced to the connate water level, about 25 percent of pore volume.

A bank of 0.11 pore volume of liquified propane was injected into the core prepared as described in the preceding paragraph from a high pressure container. A pressure of 490 pounds per square inch was maintained at the core inlet and a back pressure of 470 pounds at the outlet was utilized. After the bank of solvent had been established in the core, the container of liquified propane was replaced by a cylinder of nitrogen and nitrogen was injected to drive the propane through the core. The gas rate was controlled so that the fluids advanced through the core at a rate of approximately 100 inches per day. The produced fluids were discharged through a pressure regulator into a burette which served as a liquid-gas separator. The produced gas was then passed through a washing bottle into a wet-test meter. It was found that the gas-driven solvent bank propelled through the core in this manner permitted the recovery of 20.8 percent of the oil initially in place.

A second test similar to that described in the preceding paragraph was then carried out utilizing a bank of 0.30 hydrocarbon volume of water in advance of the gas-driven solvent bank. The core and test conditions were identical to those in the first test. Measurement of the recovered oil indicated a recovery of 45 percent of the oil initially in place.

A third test was then carried out utilizing a bank of 0.30 hydrocarbon volume of surfactant solution in place of the water bank employed in the preceding test. The surfactant solution contained 0.1 weight percent of the dioctyl ester of sodium sulfosuccinic acid, an anionic surface active agent. The core and the test conditions were again identical to those in the first test. It was found that the use of the surfactant solution increased the oil recovery to 57.4 percent of the oil initially in place. It is thus evident that the use of a bank of aqueous surfactant solution in advance of a gas-driven solvent bank during secondary recovery permits the production of a significantly greater fraction of the oil initially in place than can be recovered by means of a gas-driven solvent bank alone or by means of a gas-driven solvent bank preceded by a water bank.

What is claimed:

1. A process for recovering crude oil from a water-wet oil-bearing reservoir penetrated by an injection well and a production well which comprises:
   (a) establishing a bank of aqueous solution in said reservoir about said injection well, said aqueous solution containing a surface active agent which will readily be absorbed on subsurface strata in said reservoir and will transform said reservoir from a water-wet to an oil-wet state;
   (b) displacing said bank of aqueous solution containing said surface active agent from about said injection well by introducing a bank of low molecular weight liquefied, normally gaseous hydrocarbons into said reservoir through said injection well;
   (c) displacing said bank of liquefied hydrocarbons from about said injection well by introducing a non-condensing gas into said reservoir through said injection well; and
   (d) recovering crude oil displaced by said aqueous solution and said liquefied hydrocarbons from said reservoir through said production well.

2. A process as defined by claim 1 wherein said surface active agent is an ionic surface active agent.

3. A process as defined in claim 1, wherein said aqueous solution injected into said reservoir through said injection well contains said surface active agent in a concentration in the range between about 0.005 weight percent and about 1.0 weight percent.

4. A process as defined by claim 1 wherein from about 0.1 to about 0.75 pore volume of said aqueous solution and of said liquefied hydrocarbons are introduced into said reservoir.

5. A process as defined by claim 1 where said liquefied hydrocarbons comprise liquefied propane.

6. A process for recovering crude oil from a water-wet oil-bearing reservoir penetrated by an injection well and a production well which comprises:
   (a) injecting a bank of from about 0.1 to about 0.5 pore volume of an aqueous solution containing an ionic surface active agent into said reservoir through said injection well, said surface active agent having the ability to readily absorb on rock surfaces within said reservoir and to transform said surfaces from a water-wet to an oil-wet state;
   (b) injecting a bank of from about 0.1 to about 0.5 pore volume of low molecular weight liquefied, normally-gaseous hydrocarbons into said reservoir through said injection well under sufficent pressure to maintain said hydrocarbons in the liquefied state and displace said aqueous solution from about said injection well;

(c) injecting a non-condensing gas into said reservoir under sufficient pressure to maintain said liquefied hydrocarbons in the liquefied state and displace said bank of aqueous solution and said bank of liquefied hydrocarbons through said reservoir toward said production well; and (d) withdrawing crude oil displaced by said aqueous solution and liquefied hydrocarbons from said reservoir through said production well.

References Cited in the file of this patent

UNITED STATES PATENTS

| | | |
|---|---|---|
| 2,233,382 | De Groote et al. | Feb. 25, 1941 |
| 2,792,894 | Graham et al. | May 21, 1957 |
| 2,802,784 | Nowak et al. | Aug. 13, 1957 |
| 2,885,002 | Jenks | May 5, 1959 |
| 3,006,411 | Holbrook | Oct. 31, 1961 |

OTHER REFERENCES

Clark et al.: "Latest Oil Recovery Idea," The Petroleum Engineer, September 1957, pp. B21–26.